United States Patent Office 3,099,999
Patented Aug. 6, 1963

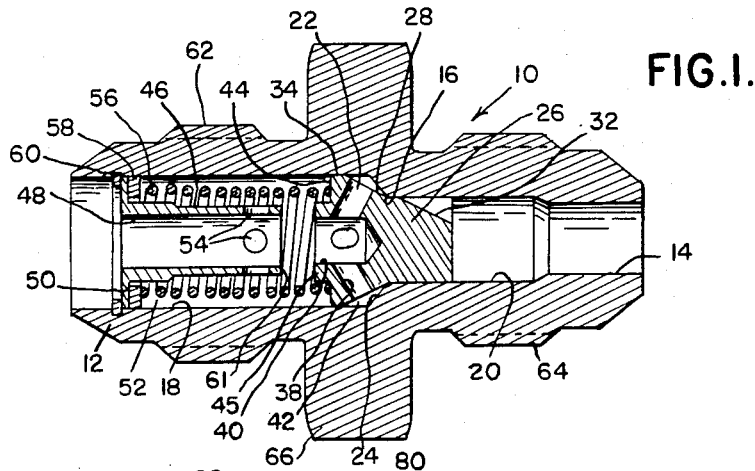

3,099,999
CHECK VALVE
John F. Vismara, Grosse Pointe Park, Mich., assignor to Holley Carburetor Company, Warren, Mich., a corporation of Michigan
Filed Mar. 6, 1961, Ser. No. 93,792
2 Claims. (Cl. 137—543.23)

This invention relates to improvements in valves. More particularly, this invention relates to a small, lightweight check valve or metering valve which has a cone or poppet that is guided on both ends and is held on its seat by a light spring. This invention is particularly adaptable in fuel systems which utilize corrosive fuels.

The purpose of check valves is to allow free fluid flow in one direction while prohibiting flow in the opposite direction. Heretofore several types of check valves have been utilized including the use of valves with ball or spherical type poppets which were backed by springs that were guided by spring perches. The ball or spherical type poppets proved to be unstable. The instability resulted from too great a gain in area for a correspondingly small increase in valve opening. The applicant has overcome this instability problem by providing a valve which has a poppet or cone that is guided on both ends, said poppet having a plurality of angled grooves on the periphery thereof at the upstream side so as to provide area gain control per increase in valve opening. The valve is adapted to crack at a given pressure differential between the upstream side and the downstream side of the valve, with the hydrodynamic fuel forces downstream of the metering area acting on the poppet in a direction to increase the metering area.

It is an object of the present invention to provide a valve having a poppet therein which is held on its seat by a spring, said poppet being guided on both ends thereof.

Another object of the present invention is to provide a valve which includes a poppet that is guided on both ends thereof on opposite sides of the metering area, said poppet including a plurality of angled grooves on the periphery thereof at the upstream end of the poppet, said poppet being responsive to a given pressure differential between the upstream side and the downstream side of the valve to provide greater area gain control per increase in valve opening.

Still another object of the present invention is to provide an improved valve of the poppet type which is stable in operation and which controls the area gain per increase in valve opening.

A further object of the present invention is to provide a simplified, low cost check or metering valve of the aforementioned type having certain advantages contributing to efficiency, reliability and long life as well as ease of maintenance.

Other objects and features of the invention will become apparent as the description proceeds, especially when taken in conjunction with the accompanying drawing, illustrating a preferred embodiment of the invention, wherein:

FIGURE 1 is a longitudinal sectional view of one embodiment of the present invention.

FIGURE 2 is a side elevation of the novel valve poppet.

FIGURE 3 is a right hand end view of the valve poppet.

FIGURE 4 is an elevational view of the spring guide.

FIGURE 5 is a left hand end view of the spring guide.

FIGURE 6 is a longitudinal sectional view of another embodiment of the present invention.

FIGURE 1 illustrates the general assembly of the valve 10. The valve 10 is particularly adaptable for fuel systems in airborne vehicles which employ corrosive fuels. As an example, hydrogen peroxide or nitrogen gas may be utilized as the fuel. In previous designs, the valve body was originally made from hard coated aluminum. The flaking of the hard coat on the sealing edge of the valve caused leakage which was greater than permissible in such systems. To overcome this leakage problem, it has been found that a stainless steel body which is compatible with the corrosive fluid may be utilized. Additionally, aluminum specially treated with a sulfuric acid anodize may be used as the material for the valve body 12.

The valve body 12 has an axially extending passage 14 therethrough. Passage 14 is of smaller diameter on the upstream end of the poppet seat or annular sealing edge 16 than on the downstream end. The downstream and upstream branches of passage 14 are represented by numerals 18 and 20 respectively. The annular sealing edge 16 provided in the valve body 12 is made sharp and smooth. At the downstream side of the annular sealing edge 16, a true conical surface 24 is provided in the valve body 12. The conical surface 24 is at a greater angle than the intermediate conical surface 22 provided on the valve poppet 26. The fuel is metered across the annular sealing edge 16 when the poppet 26 is moved in the valve opening direction.

The valve poppet or cone 26 is usually made from Teflon and includes as part of the conical surface 22 a conical sealing portion 28 that has a very close fit with the annular sealing edge 16 to terminate flow through the passage 14 when the poppet 26 is in a closed position as is shown in FIGURE 1. The upstream cylindrical end of the poppet 26 includes a plurality of cylindrical guide portions 30 which are separated by angled grooves 32. The grooves 32 are equally spaced on the periphery, as shown in FIGURE 3, and are usually formed on the periphery of the poppet 26 by a milling cutter. The inner ends of the grooves 32 intersect the cylindrical periphery of the poppet 26 at a point upstream of the conical sealing portion 28. The cylindrical guide portions 30 have a close fit with the walls of the branch passage 20.

The portion of the poppet 26 on the downstream side of the annular sealing edge 16 includes an uninterrupted cylindrical guide portion 34 which has a close fit with the wall of the body 12 defining the branch passage 18. A plurality of equally spaced passages 38 are drilled through the conical surface 22 to intersect the axially extending passage 40 which is open on the downstream end of the poppet 26. When in an assembled position, the conical surface 22 of the poppet 16 defines with the conical surface 24 and passage 18 a fluid chamber 42 which communicates with passages 38. The downstream end of the poppet 26 has an annular flat spring surface 44 and an abutment surface 45.

A cylindrical spring guide 46 is provided in branch passage 18 and has a fluid passage 48 extending therethrough. When in an assembled position, the passage 48 is axially in line with the passage 40 provided in the poppet 26. The spring guide 46 has an annular flange 50 which engages the wall of passage 18 and defines one side of the spring chamber 52. A plurality of radial holes 54 is provided in the stem portion of the spring guide 46 to permit fluid or fuel trapped in the spring chamber 52 to escape.

A spring 56 is provided in the spring chamber 52 around the outer periphery of the spring guide 46. One end of the spring 56 may abut the annular flange 50 of the spring guide 46. The other end of the spring 56 acts against the spring surface 44 provided on the poppet 26 to urge the poppet 26 in a valve closing direction. The pre-load on the poppet 26, which controls the cracking pressure of the valve 10, is adjustable by means of the shim 58. The thickness of the shim 58 may be varied to control the pre-load. The spring 56 and the spring guide 46 are all retained in the body 12 by a snap ring 60.

The body 12 has threaded end fittings, as represented by numerals 62 and 64, so that the valve 10 may be threaded into the fuel lines associated therewith. A hexagonal flange 66 is provided on the body 12 to which a wrench or similar tool may be applied for inserting the check valve 10 in the fuel system.

As viewed in FIGURE 1, the upstream end of the valve 10 is at the right of the metering or sealing edge 16. Fuel acts against the spring biased poppet 26. When a predetermined pressure differential has been obtained between the upstream and downstream sides of the poppet 26, the valve poppet 26 is moved to the left, an amount depending on the pressure differential. The total movement of the poppet 26 is limited by the engagement between the abutment surface 45 of the poppet 26 and the end wall 61 of the spring guide 46. After the valve 10 has cracked, fuel flows through the angled grooves 32, across the metering edge 16 and through chamber 42, passages 38 and 40, into the spring chamber 52 in the valve body 12. The fuel then flows through the radially extending passages 54 and the axial passage 48 to the place of use. As the position of the poppet 26 is changed due to an increase or decrease in the pressure differential, a greater or smaller quantity of fuel respectively is allowed to pass through the valve 10. In this way, the rate of fuel consumption is controlled.

The important and essential part of the present invention is that the use of the angled grooves 32 on the upstream end of the poppet 26 allows for a much greater area gain control per increase in valve opening. With such a construction, a bucket effect just downstream of the metering area is provided. This bucket effect has hydrodynamic forces that are beneficial in the further opening of the valve once it has cracked. The force of the fuel acts on the conical portion 22 to move the poppet 26 further to the left as viewed in FIGURE 1. It should be understood that by changing the angle of the grooves 32 on the upstream end of the poppet 26, the area gain per increase in valve opening can be adjusted.

FIGURE 6 is another embodiment of the present invention. Where appropriate, the same numerical designations will be used to identify similar structures. The valve comprises a two-piece body construction designated respectively by the numerals 70 and 72. The body 72 is threadedly connected to body 70 as indicated by numeral 74. Bodies 70 and 72 are provided with special threaded end fittings 76 and 78 respectively which are adapted to be inserted into the fuel system.

The body 72 includes an enlarged cylindrical bore 80 downstream of the annular sealing edge 16 for guiding the poppet 26 in the manner described for the embodiment shown in FIGURE 1. The body 70 is provided with a cylindrical bore 82 which is axially in line with bore 80. Bores 80 and 82 define the spring chamber 83. The spring guide 46 has its annular flange 50 in engagement with the wall of the bore 82. Shims 84 and 86 are provided on opposite sides of the flange 50 for providing a predetermined pre-load on the spring 56 which biases the poppet 26 in a valve closing direction.

The basic differences between the two embodiments are in the construction of the valve body; in the size of the end fittings; and in the specific manner in which the spring guide 46 is held in place. In the first embodiment, a snap ring 60 is utilized to retain the spring guide 46 and spring 56 in place, while in the other embodiment shown in FIGURE 6, the annular wall 88 provided in the body 70 prevents the spring guide 46 and spring 56 from moving to the left. In certain applications where small end fittings are required on the valve body, the use of a two-piece body is required for assembly purposes. The embodiments utilize the same internal parts with the exception that the spring 56 has a lighter rate in the valve construction illustrated in FIGURE 6 than the spring used in FIGURE 1.

The valve just described is particularly adaptable for low pressure operation. As an example, 12 s.c.f.m. of nitrogen fuel will flow through the valve at a pressure differential of less than 10 p.s.i. The valve is designed to seal to less than ¼ cc. per hour at standard conditions with a reverse flow pressure differential from 1″ Hg to 200 p.s.i.

The drawing and the foregoing specification constitute a description of check valve in such full, clear, concise and exact terms as to enable any person skilled in the art to practice the invention, the scope of which is indicated by the appended claims.

What I claim as my invention is:

1. A fluid valve comprising a body having a straight-through flow passage therein, an annular valve seat intermediate the ends of said passage, a part of said passage on the downstream side of said valve seat being larger in transverse cross-section than the part of said passage on the upstream side thereof, a valve member movable lengthwise in said passage, said valve member including an intermediate portion, the outer periphery of which is conical and provided with a conical sealing surface which is adapted to seat against said valve seat to terminate flow of fluid in said passage, said intermediate portion being spaced from the wall of said larger part of said passage to provide therebetween an annular fluid pocket on the downstream side of said valve seat, said valve member including upstream and downstream portions on opposite sides of said intermediate portion, said upstream portion including a plurality of equally spaced fluid metering grooves on the periphery thereof, said grooves each having a pair of parallel side walls of gradually increasing height and a bottom wall inclined towards the longitudinal axis of said valve member starting at a point adjacent said intermediate portion and terminating at the upstream end of said valve member, said grooves being separated by arcuate guide surfaces of part-cylindrical configuration which bear against the wall of the smaller part of said passage on the upstream side of said valve seat, said grooves defining with said annular valve seat a metering area which varies with incremental changes in the position of said valve member in said passage, said downstream portion including a complete annular guide surface of cylindrical configuration in surface-to-surface contact with the wall of the larger part of said passage downstream of said valve seat, said valve member having an opening in the downstream end thereof, a plurality of fluid passage means in the intermediate portion of said valve member connecting said annular pocket with said opening in said valve member, said fluid passage means and said opening being in communication with the aforesaid metering area through said pocket to transmit the fluid to the outlet end of said passage, said arcuate and annular guide surfaces being constructed and arranged to be in continuous contact respectively with the smaller and larger parts of the wall of said passage throughout the entire range of movement of the valve member to stabilize the movement of said valve member in said passage.

2. A fluid valve comprising a body having a straight-through flow passage therein, an annular valve seat intermediate the ends of said passage, a part of said passage on the downstream side of said valve seat being larger in transverse cross-section than the part of said passage on the upstream side thereof, a valve member movable lengthwise in said passage, said valve member including an intermediate portion, the outer periphery of which is conical and provided with a conical sealing surface which is adapted to seat against said valve seat to terminate flow of fluid in said passage, said intermediate portion being spaced from the wall of said larger part of said passage to provide therebetween an annular fluid pocket on the downstream side of said valve seat, said valve member including upstream and downstream portions on opposite sides of said intermediate portion, said upstream portion including a plurality of equally spaced fluid metering grooves on the periphery thereof, said grooves each having a pair of parallel side walls of gradually increasing height and a bottom wall inclined towards the longitudinal axis of said valve member starting at a point adjacent said intermediate portion and terminating at the upstream end of said valve member, said grooves being separated by arcuate guide surfaces of part-cylindrical configuration which bear against the wall of the smaller part of said passage on the upstream side of said valve seat, said grooves defining with said annular valve seat a metering area which varies with incremental changes in the position of said valve member in said passage, said downstream portion including a complete annular guide surface of cylindrical configuration in surface-to-surface contact with the wall of the larger part of said passage downstream of said valve seat, said valve member having an opening in the downstream end thereof, a plurality of fluid passage means in the intermediate portion of said valve member connecting said annular pocket with said opening in said valve member, said fluid passage means and said opening being in communication with the aforesaid metering area through said pocket to transmit the fluid to the outlet end of said passage, said arcuate and annular guide surfaces being constructed and arranged to be in continuous contact respectively with the smaller and larger parts of the wall of said passage throughout the entire range of movement of the valve member to stabilize the movement of said valve member in said passage, an abutment in the larger part of said passage downstream of said valve seat, said abutment being spaced from the downstream end of said valve member, a tubular spring guide in the space between said abutment and said valve member and spaced from the wall of the larger part of said passage to define a spring chamber therebetween, the interior of said spring guide being in fluid communication with the opening in said valve member, a spring in said spring chamber surrounding said guide for biasing said valve member in a valve closing direction, said spring guide including an abutment on the end opposite said valve member for limiting the movement of said valve member in a valve opening direction, said spring guide having a plurality of ports therein for connecting said spring chamber with the interior of said spring guide.

References Cited in the file of this patent

UNITED STATES PATENTS

| | | |
|---|---|---|
| 1,116,794 | Butler | Nov. 10, 1914 |
| 1,274,680 | Calvert | Aug. 6, 1918 |
| 2,318,962 | Parker | May 11, 1943 |
| 2,547,862 | Gilmore | Apr. 3, 1951 |
| 2,930,401 | Cowan | Mar. 29, 1960 |

FOREIGN PATENTS

| | | |
|---|---|---|
| 709,837 | Great Britain | June 2, 1954 |